(No Model.)

P. WINTER.
COMBINED ICE CREAM MOLD AND CUTTER.

No. 512,080. Patented Jan. 2, 1894.

WITNESSES:
Charles Schroeder
Adolph Scherer

INVENTOR
Philipp Winter
BY
Goepel & Raegener
ATTORNEYS.

THE NATIONAL LITHOGRAPHING COMPANY,
WASHINGTON, D. C.

UNITED STATES PATENT OFFICE.

PHILIPP WINTER, OF BROOKLYN, NEW YORK.

COMBINED ICE-CREAM MOLD AND CUTTER.

SPECIFICATION forming part of Letters Patent No. 512,080, dated January 2, 1894.

Application filed June 22, 1893. Serial No. 478,453. (No model.)

*To all whom it may concern:*

Be it known that I, PHILIPP WINTER, a citizen of the United States, and a resident of Brooklyn, in the county of Kings and State of New York, have invented certain new and useful Improvements in a Combined Ice-Cream Mold and Cutter, of which the following is a specification.

This invention relates to an improved ice-cream mold and cutter by which ice-cream or similar substances can be readily cut into a number of pieces of equal size, so as to be served to better advantage at places where ice-cream is sold at retail, as in ice-cream saloons, at picnics, &c.

Heretofore ice-cream was either cut into pieces of uniform size and wrapped up in wax or other paper and replaced in the box so as to be kept in frozen condition, or served by removing it with a spoon from the ice-cream mold or other receptacle in which it was shipped. In one case the pieces adhere to each other, notwithstanding the separating paper-wrappers and cannot be served in their original shape on removing the wrapper, while the other method is objectional owing to the disagreeable form in which the ice-cream is presented to the customer. By my invention, the cakes or pieces of ice-cream are all of absolutely uniform size, so as to be attractive to the eye when served.

For this purpose of cutting the body of ice-cream, my invention consists of an improved ice-cream mold and cutter, which comprises a receptacle, open at the top and bottom and provided with an inwardly-projecting bottom-shoulder, a follower having a flanged upper part, guided in the bottom of the receptacle, handles hinged to the end-walls of the ice-cream receptacle, said handles forming supports for the receptacle when it is filled or shipped a cover for the ice-cream receptacle, and a cutter formed of a frame fitting to the top of the ice-cream receptacle and provided with longitudinal and transverse cutting wires, by which the body of ice-cream in the receptacle is cut into small pieces on pressing the cutting-frame and receptacle in downward so that the follower moves up into the receptacle and forces the ice cream through the wires of the cutting-frame, as will be fully described hereinafter and finally pointed out in the claims.

Figure 1:
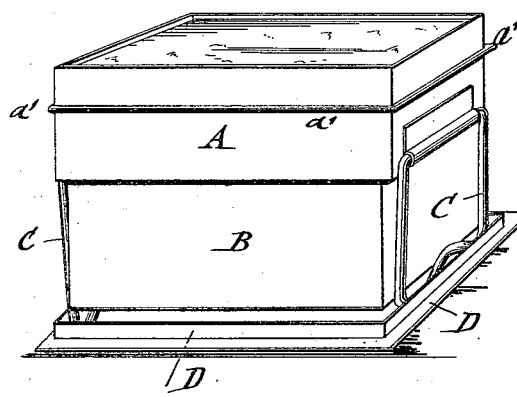
Figure 2:
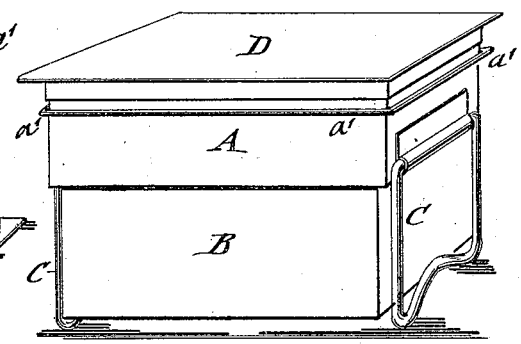
Figure 3:
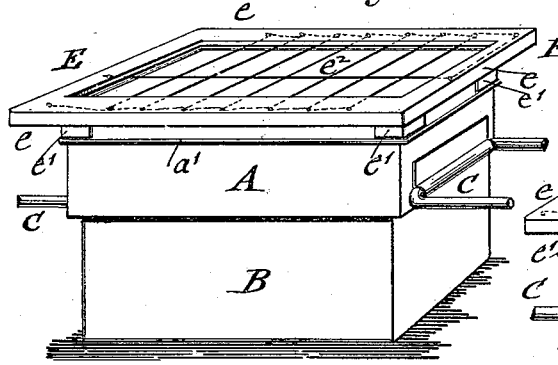
Figure 4:
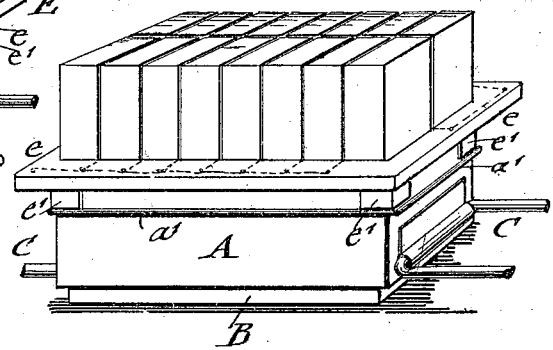
Figure 5:
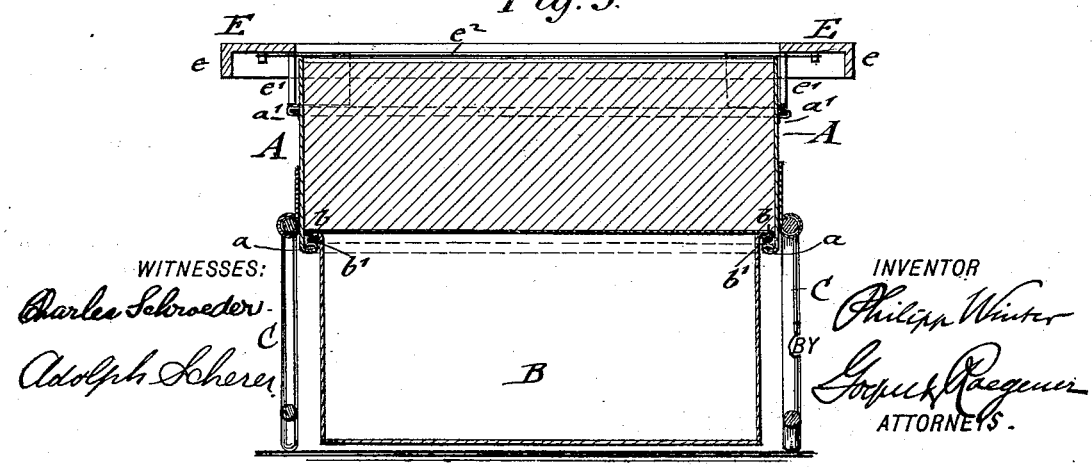

In the accompanying drawings, Figure 1, represents a perspective view of my improved ice-cream mold, showing the same in position for being filled with ice-cream. Fig. 2, is a perspective view showing the same filled and ready for shipment. Fig. 3, is also a perspective view showing the cutting-frame in position on the receptacle. Fig. 4, is a perspective view showing the body of ice-cream cut into pieces of uniform size ready for being served, and Fig. 5 is a vertical longitudinal section of my improved ice-cream mold, showing the cutting frame in position on the same ready for cutting.

Similar letters of reference indicate corresponding parts.

Referring to the drawings, A represents a receptacle for the ice-cream, which is open at the top and bottom and provided with an inwardly projecting bottom-flange or shoulder $a$. In the receptacle A is guided a follower B which corresponds in shape to the receptacle A and which is preferably made of sheet-metal and provided at its upper end with a flange $b$ and an elastic gasket $b'$ that rest on the shoulder $a$ on the bottom of the receptacle A.

To the end-walls of the receptacle A are hinged supporting-frames C C which are made of stout wire and which are used as supports when the ice-cream mold is to be filled or shipped, in which case they are moved into downwardly-extending position, as shown in Figs. 1 and 2. The receptacle A is closed by a cover D which is removed when the body of ice-cream in the receptacle A is to be cut into smaller pieces. A cutting frame E, which is composed of an exterior frame $e$ having angular corner pieces $e'$ and longitudinal and transverse cutting wires $e^2$, corresponds in size and shape to the receptacle A and is placed over the top of the receptacle A whenever it is desired to cut the contents of the same into a number of small pieces for sale. The corner pieces $e'$ rest on an exterior flange or head $a'$ of the receptacle, so that the cutting wires rest on the edge of the receptacle as shown in Figs. 3 and 5.

My improved ice-cream mold and cutter is used as follows: When the mold is to be filled with ice-cream the handle-frames C are moved in downward direction, so that the receptacle is supported by the same. The cover is then removed and used as a base into which the handles are placed. The follower B is moved in downward direction until its top-flange $b$ rests on the shoulder $a$ of the receptacle A, as shown in Fig. 1. The receptacle is then filled with ice-cream and the cutting-frame E placed in position on the top of the receptacle A, it being held in position thereon by the corner-lugs resting on the exterior head of the receptacle. The receptacle and cutting frame are then pressed in downward direction over the follower B, so that the entire body of ice-cream contained in the receptacle is forced through the wires of the cutting-frame in upward direction until the follower arrives in contact with the wires of the cutting-frame. The entire body of ice-cream in the receptacle is cut by the wires into a number of pieces of uniform size, which present by their freshly cut edges a very neat and attractive appearance. The sliced body of ice-cream can then be transferred into another box for shipment to the place of use, or it may be shipped in the receptacle A by lowering the follower and returning the ice-cream into the receptacle. The cover is then replaced, the handle-frames placed sidewise of the receptacle and the mold is then ready for shipment to the place of use.

The invention thereby forms a combined mold and cutter that can be used for serving ice-cream wherever ice-cream is sold at retail, or on a smaller scale for domestic purposes, as the emptying of the mold and cutting of the ice-cream into small pieces is accomplished with great facility.

Having thus described my invention, I claim as new and desire to secure by Letters Patent—

1. An ice-cream mold, formed of an ice-cream receptacle, a follower-block guided in the bottom of the same, a cover for the said receptacle, and frames hinged to the end-walls of the receptacle and adapted to form supporting standards for the same, substantially as set forth.

2. A combined ice-cream mold and cutter, consisting of an ice-cream receptacle, a follower block guided in the receptacle, a cutting-frame supported at the top of the ice-cream receptacle and provided with intersecting cutting-wires and frames hinged to the end-walls of said receptacle and adapted to be used as supporting standards, substantially as set forth.

3. An ice-cream-mold, composed of a receptacle open at the top and bottom and provided with an inwardly-extending bottom-shoulder, a follower-block having a top-flange guided in the open bottom of the receptacle, said follower-block being adapted to remove the entire body of ice-cream in the receptacle, and a covering for the receptacle, substantially as set forth.

4. The combination, with an ice-cream receptacle having an open top and bottom and an inwardly-projecting bottom-shoulder, a follower-block having a top-flange guided in the bottom of the receptacle, a cutting frame applied to the top of said receptacle and provided with longitudinal and transverse cutting-wires, and supporting frames hinged to the end-walls of the receptacle, substantially as set forth.

5. The combination of an ice-cream receptacle having an open top and bottom and an exterior head below the top of said receptacle, a follower-block guided in said receptacle, frames hinged to the receptacles for supporting the same and a cutting-frame provided with intersecting cutting wires and with corner-lugs that rest on the exterior head of the receptacle, so that the cutting-wires are flush with the upper edge of the receptacle, substantially as set forth.

In testimony that I claim the foregoing as my invention I have signed my name in presence of two subscribing witnesses.

PH. WINTER.

Witnesses:
PAUL GOEPEL,
CHARLES SCHROEDER.